Figure 1:
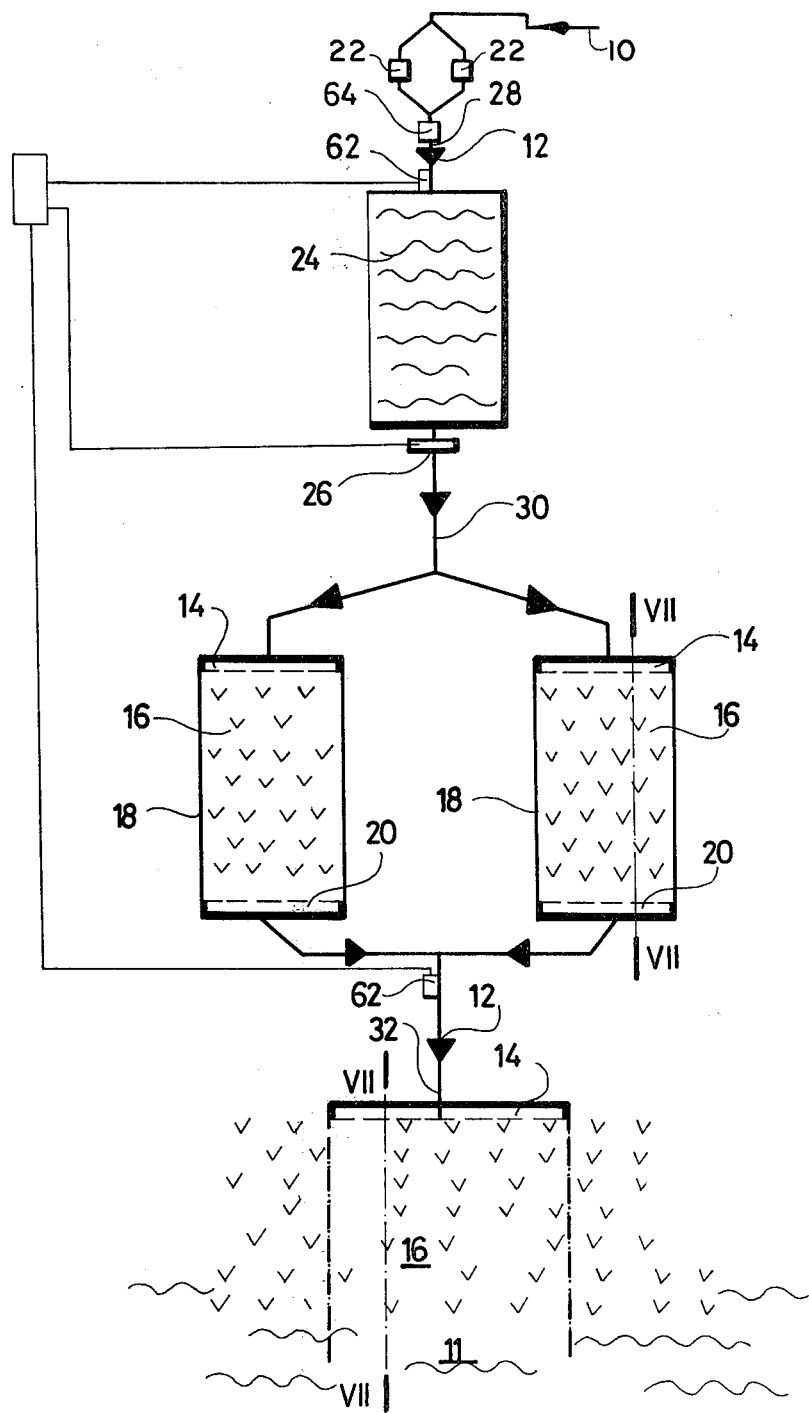

United States Patent [19]

Plósz et al.

[11] 4,333,837
[45] Jun. 8, 1982

[54] WATER PURIFICATION PROCESS AND APPARATUS

[75] Inventors: Sándor Plósz; Katalin Babos; Károly Rózsavolgyi; Lajos Felföldy, all of Budapest, Hungary

[73] Assignee: Városépitési Tudományos és Tervezö Intézet, Budapest, Hungary

[21] Appl. No.: 119,855

[22] Filed: Feb. 11, 1980

Related U.S. Application Data

[63] Continuation of Ser. No. 929,275, Jul. 31, 1978, abandoned.

[30] Foreign Application Priority Data

Aug. 4, 1977 [HU] Hungary .............................. VA 1507

[51] Int. Cl.³ ................................................ C02F 3/32
[52] U.S. Cl. .................................... 210/602; 210/170; 210/253; 210/257.1; 210/747; 47/59
[58] Field of Search ........................ 47/1.4, 59; 210/2–9, 210/11, 14, 15, 17, 150, 151, 170, 253, 257 R, 259, 285, 286, 96.1, 602, 615, 620, 747, 614, 257.1

[56] References Cited

U.S. PATENT DOCUMENTS

| | | | |
|---|---|---|---|
| 807,667 | 12/1905 | Dunbar | 210/17 |
| 3,728,254 | 4/1973 | Carothers | 210/17 |
| 3,770,623 | 11/1973 | Seidel | 210/2 |

FOREIGN PATENT DOCUMENTS

| | | | |
|---|---|---|---|
| 2148996 | 4/1973 | Fed. Rep. of Germany | 210/2 |
| 2150480 | 4/1973 | Fed. Rep. of Germany | 210/11 |
| 2210619 | 9/1973 | Fed. Rep. of Germany | 210/11 |
| 2445665 | 4/1976 | Fed. Rep. of Germany | 210/96.1 |

OTHER PUBLICATIONS

"Green Systems for Wastewater Treatment", *Envir. Sci. & Tech.*, May 1975, pp. 408 & 409.

*Primary Examiner*—Peter A. Hruskoci
*Attorney, Agent, or Firm*—Gabriel P. Katona

[57] ABSTRACT

Process for the purification of water that is polluted with diffuse substances originating from ablation, such as fertilizers, mineral and soil particles, oils, wastes, detergents, and primarily inorganic substances, which might accelerate undesirable entrophication of the receiving waters such as lakes, comprising the steps of introducing the polluted water to be purified into a defined area (e.g. a basin); spreading the water crosswise to increase its surface area; and extracting the diffuse pollutants by applying a biological treatment by the expedient of at least one group of suitable aquatic plants. An apparatus for performing the process comprises means that provide a flow path for the water; at least one dividing structure that performs the spreading; and at least one aquatic plant region, with at least one plant zone, wherein the plants contribute to the above-mentioned biological treatment. Several optional procedural and structural details are also disclosed.

10 Claims, 7 Drawing Figures

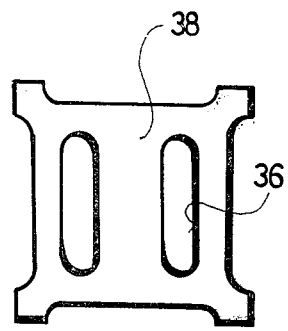
FIG. 3
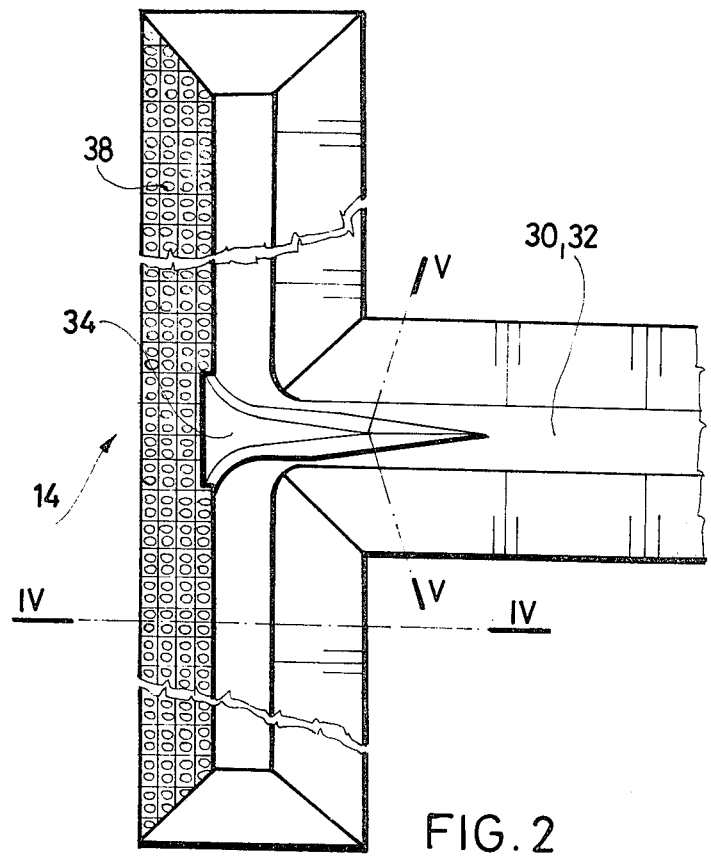
FIG. 2
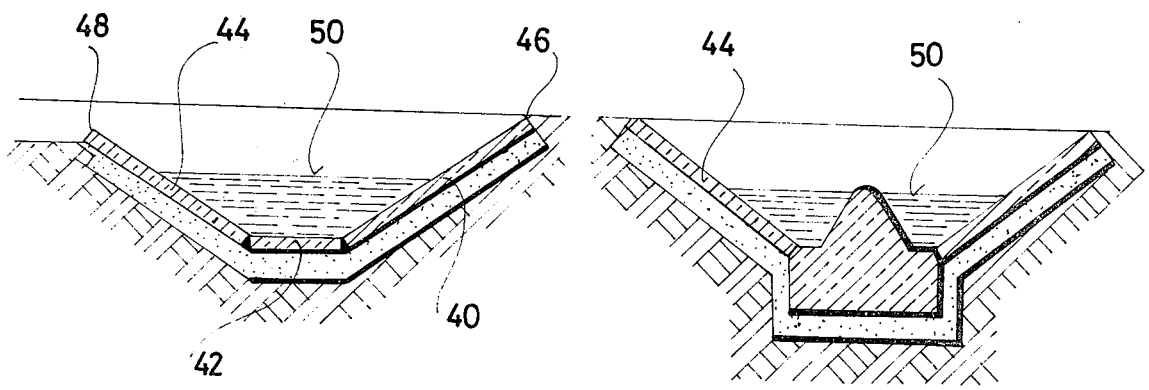
FIG. 4
FIG. 5

WATER PURIFICATION PROCESS AND APPARATUS

This is a continuation of application Ser. No. 929,275, filed on July 31, 1978 now abandoned.

The invention relates to a process and a suitable, exemplary apparatus or arrangement for the purification of water that became polluted or soiled with diffuse substances originating from ablation (that is, having been rinsed away), that might accelerate undesirable eutrophication of the receiving waters (e.g. lakes).

It is known that it is one of the objects of water quality control to withhold and/or destroy as far as possible pollutants and impurities that could reach various living water bodies (called receiving waters) from the surrounding terrain. Numerous processes and apparatus are known for removing punctiform pollutants such as originate from the outlets of sewage systems.

The pollutants that result from ablations are usually known in the literature as diffuse or non-punctiform pollutants. So far it was not possible to destroy or transform these pollutants. Such diffuse pollutants are, for example, fertilizers that are rinsed away from agriculturally worked terrains, plant protecting agents, as well as mineral and soil particles that are mobilized by way of erosion, oils, wastes, scouring agents and detergents.

The removal of the diffuse pollutants becomes more difficult because downpours, melting snow, heavy rainfall, cause substantial amounts of water to be produced and moved about. Furthermore the pollutant concentration of the waters is relatively small while their quantities may be rather large and change in time. It should be noted that the diffuse pollutants contain primarily inorganic substances such as nitrogen, phosphorus and potassium compounds, which are useful for plants, and they speed up the natural eutrophication process of the receiving waters in an undesirable manner. It is of utmost importance to prevent this for considerations of environmental protection.

It is one of the objects of the present invention to prevent the speeding up of eutrophication in receiving waters.

It is accordingly the object of the present invention to provide a process and an apparatus or arrangement by which the waters containing such pollutants or impurities can be purified and liberated from the diluted (diffuse) substances, before they reach the receiving waters, which pollutants originate from the earlier-explained ablations and would undesirably speed up the eutrophication of the receiving waters.

As a basic concept of the invention, it was recognized that the inventive object can be solved by biologically fixing and extracting the diffuse pollutants.

According to important features of the inventive process, namely for the purification of water that is polluted with diffuse substances of the kind described earlier, originating from ablation, which substances might accelerate undesirable eutrophication of the receiving waters such as lakes, the polluted water to be purified is introduced into at least one, at least partly defined area; the water is then spread crosswise to increase its surface area; and the diffuse pollutants are fixed and extracted as it were within the area by applying a biological treatment in at least one zone that is fitted with at least one group of suitable aquatic plants.

The spreading of the water being treated assists in making contact all over with the aquatic plants in the area. Optional features will become understood from the reading of the detailed description that follows.

Important features of a preferred, exemplary apparatus or arrangement for performing the new process are: means are provided to guide the water being treated along at least one flow path; at least one, preferably wedge-shaped structure is placed into the flow path for spreading the water, as explained above; and there is at least one aquatic plant area or region, with at least one distinct plant zone (or at least two), covering the entire width of the spread water, with the plants grown in at least one zone, as was mentioned before, to contribute to the biological treatment forming part of the inventive water purification.

Here again optional, additional features are disclosed that are useful and contribute further to the inventive effect.

Figure 6:
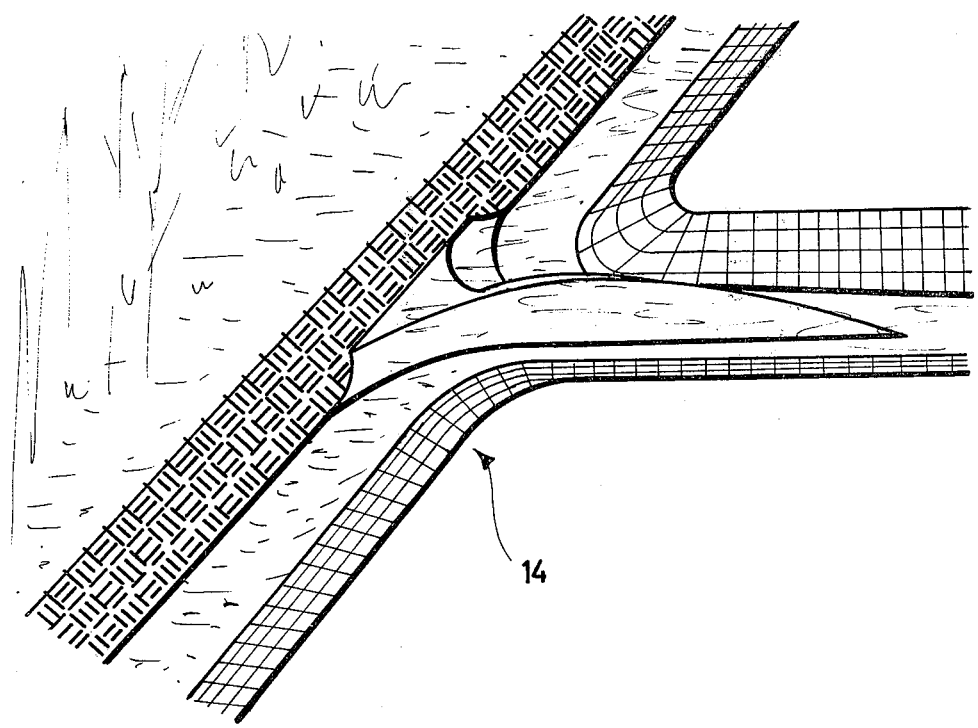
Figure 7:
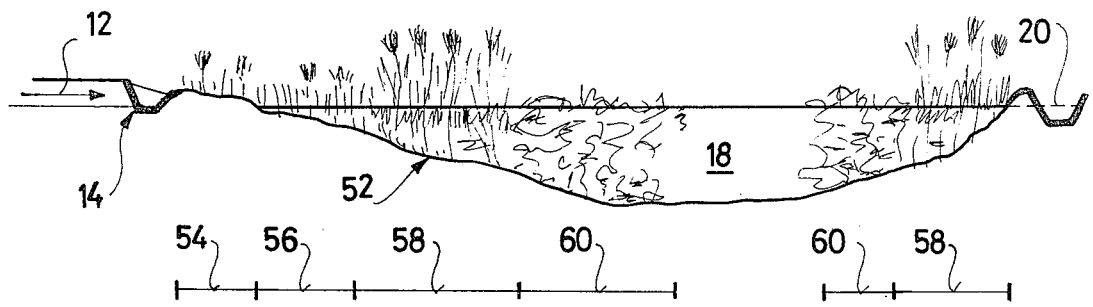

Further objects, features and advantages of the invention will become better understood from the following detailed description when considered with the accompanying drawings, wherein FIG. 1 illustrates a schematic layout of an exemplary, preferred water purification apparatus or arrangement according to the present invention;

FIG. 2 constitutes a top view of the arrangement appearing in FIG. 1, on a somewhat larger scale;

FIG. 3 shows a portion of FIG. 2, again on a larger scale;

FIG. 4 constitutes a vertical section taken along line IV—IV of FIG. 2;

FIG. 5 is another vertical section taken along line V—V of FIG. 2, in a direction substantially perpendicular to that of FIG. 4;

FIG. 6 offers a somewhat schematic perspective view of the arrangement of FIG. 2; and FIG. 7 is a vertical sectional view, again somewhat schematic, taken along either of the lines VII—VII in FIG. 1.

Polluted or contaminated water flow 10 is shown to enter and eventually reach a receiving lake 11 (identified at the very bottom of FIG. 1; preceding or intermediate units of the apparatus, being partly optional, will be described later), the direction of water flow being identified in some figures by numeral 12. It will be understood that lake 11 constitutes the living water body to be protected from the pollutants present in the water flow 10.

In accordance with the invention, a water dividing engineering structure 14 is provided, in the direction of the flow 12, as well as an aquatic plant area 16 that fills the cross-section of the water that has been spread by the structure 14. This increases the surface area of the polluted water being purified and makes for an overall contact with the aquatic plants, as will be seen later. It is their purpose in area 16 to fix or immobilize, eventually extract as it were, the diffuse pollutants and impurities, thereby accelerating the ageing or maturation of the cleaned water in the lake 11.

In the illustrated preferred, exemplary arrangement of the inventive water purification apparatus two parallel-connected aquatic plant areas 16 are provided through which the polluted water is made to flow (see again the arrows 12), a third such area 16 being provided along the banks or borders of the lake 11 (bottom of FIG. 1); one can also refer to them as "regions" 16. The plant areas or regions 16 are located within optional basins or pools 18 that have an approximate width of the dividing structurer 14. Both basins 18 may have outflows 20 that collect the water after having passed the respective aquatic plant area 16 in that basin. It is suggested that the outflows 20 be made in the form of concrete channels (not shown) that have openings facing the areas 16.

The third plant area 16, along the banks of the lake 11, has its sides identified by dot-dash lines to indicate these to be indefinite borders (as against the sides of the basins 18). It is however possible to provide an arrangement which has a single aquatic plant area or unit 16. The parallel-connected units 16 have the advantage that they can be operated alternatively. This permits maintenance and regeneration or upkeep jobs to be performed while the water purification apparatus is in continued operation.

It is seen toward the top portion of FIG. 1 that one or two settling or suspension trap units 22 can be provided in a parallel arrangement. These units precede the water dividing structures 14 of the aquatic plant areas 16. If two parallel units 22 are used, they can again be operated alternatively, their main purpose being the removal of rubble drift from the water flow 10.

The invention furthermore provides the optional use of a water storage unit 24, built between the unit or units 22 and the structures 14, provided with a sluice 26 and serving to regulate the amount of polluted water that is allowed to reach the plant areas 16, depending on the proportion of the pollutant content and/or the settling or removing capability of the areas or units 16, by storing the water for a predetermined time.

As can be seen from FIG. 1, respective channels 28, 30 and 32 are provided: first, between the trap unit(s) 22 and the water storage 24; then, between the latter and the parallel-connected dividing structures 14; and, finally, between the outflows 20 of the units 16 and the third dividing structure 14. These channels are preferably open ditches that have concrete surfaces at their bottoms and sides. It would of course be possible to use covered trenches or conduits in lieu of open ditches.

Further details, and particularly those of the water dividing structures 14 can be seen in FIGS. 2 through 6. FIG. 2 shows that the dividing structure 14 is substantially perpendicular to the channel(s) (30) 32 that lead(s) out from the illustrated unit. At the juncture, a wedge-shaped deflecting or dividing element 34 is provided for this purpose (FIGS. 2, 5). When the dividing structure 14 is made in the illustrated, now described form, it is preferably built as FIG. 4 wherein a right-hand side wall 40, a bottom 42, and a left-hand side wall 44 are combined, all preferably made from concrete, for containing the polluted water. The left-hand wall 44 is preferably made of prefabricated concrete elements 38 (see FIG. 3) that have openings 36 therein.

The earlier-mentioned channels 28, 30, 32 are preferably constructed in a manner similar to that shown in and described for FIG. 4, possibly without the openings in one of the side walls.

The top edge 46 of the wall 40 in FIG. 4 is built higher than the similar top edge 48 of the wall 44 (which has the openings 36 therein), the former being in this case at ground surface level. Should the water level 50 within the unit 14 exceed the top edge 48, flow will be possible only toward the aquatic plant area, region or unit 16.

Particulars of the area 16 are shown in FIG. 7. The soil level below this area has been designated with numeral 52, and the flow direction 12, the water dividing structure 14 and the basin 18 are also identified, where the area 16 is located. Lengthwise, along the flow of the polluted water, the area is divided into several zones (54 to 60) that should contain different aquatic plant groups.

Thus, as a matter of example, in a swamp zone 54 (that immediately follows the structure 14) the ruling plants are suggested to be /Latin names being given throughout for an unambiguous understanding/: *Carex gracilis, Festuca pratensis, Carex acutiformis,* etc.

In a subsequent marsh zone 56 the inventors propose to plant *Juncus subnodulosus, Typha lattifolia, Typhoides arundiaseae, Glyceria maxima, Bolboschoenus maritimus,* etc. It should be understood that these are all merely preferred examples, the number of suitable plants and even groups thereof being much greater but within the knowledge of the man skilled in this art, namely for a stepwise and gradual biological treatment of such polluted waters.

In the direction of water flow, now follows a reed zone 58 with the following plants being suggested therefor: *Phragmites communis, Ceratophyllum submersum, Hydrocharis morsus ranae, Lemna, "tricularia vulgaris, Stratiotes aloides,* etc., as well as algae and the like, plankton, etc.

Finally, in a quaking zone 60, one can use with advantage the plants *Potamogeton perfoliatus, Potamogeton pectinatus, Myriophyllum spictatum,* etc. The sequence and suggested location of the zones can be seen in FIG. 7 but can be modified if required.

It is important to prevent the formation of sheafs and "short-circuits" in the aquatic plant areas 16, which would greatly detract from the efficiency of purification. In the reed zone 58, the depth of the water is preferably around 1.5 meters. The selection of the actually used aquatic plants and the respective depths in the explained zones understandably will depend on soil conditions, available moisture, quality of the polluted water, and on prevailing climate.

FIG. 1 schematically shows an optional sensor 62 built into one of the channels, e.g. 28, so as to be able to measure the percentage of pollutants in the arriving water 10. It is also possible to insert similar sensors 62, namely in at least the channel 32, as shown, leading to a common (not identified) control unit. Comparing the indications of the first sensor with that or those of the subsequent one(s), one can establish how much of the pollutants has been removed in the aquatic plant area(s) 16 (or in the preceding, optional water storage 24).

Automatic operation of the inventive purification apparatus can be provided by way of the just mentioned control unit, e.g. by operating the sluice 26 that is also connected to the former, to control water throughput at least for the areas or units 16.

With a view to removing pollutants, particularly spilled oil, from the water flow 10, it is possible to intercalate an oil trap 64 between the suspension trap unit 22 and the water storage 24 if provided.

The operation of the inventive water purification apparatus or arrangement, and the steps taken in the inventive process, are essentially as follows. Contaminated or polluted water 10 is first introduced into the suspension trap unit 22 to remove entrained rubble. The water now reaches the storage 24, if provided, by way of the channel 28. The oil trap 64 is suitable to remove oil (and other impurities) while the sensor 62 serves to measure the amount of pollutants or impurities contained in the imputted water. A substantial proportion of the floating rubble is deposited within the storage 24.

The outflow from the storage 24 is controlled by the sluice 26, and water now passes through the channel 30 to one of the two parallel-connected dividing structures 14 for evenly spreading the water. It reaches the aquatic plant area(s) 16 through the openings 36 of the concrete elements 38. The diffuse pollutants of the water are fixed and at least partly settled in this area, extracted as it were, by biological and absorptive procedures.

During most of a year's time the soil is impregnated with water so that the organic-substance content is accumulated as a result of anaerobic conditions. This makes for excellent effects of the aquatic plant area(s) 16 in terms of adsorption and filtration, as well as fixing of detergents and pesticides.

It can be summarized that the aquatic plant areas 16 are highly suitable to extract diffuse pollutants from the water to the required degree so that continuous and efficient purification is performed.

Whether one or both areas 16 have been used so far, the water is collected at the outflow(s) 20, led to the channel 32 and spread by way of the dividing structure 14 of the third unit 16 if provided. The degree of pollutant content of the channel 32 can be periodically ascertained with the sensor 62.

The spread water has now reached the basin-bank aquatic plant area 16 that was explained earlier, from where the water reaches the lake 11 partly by soil leakage through the root zone, and partly on the surface, the latter making use of nutrient-binding capabilities of live deposits on the plant vegetation. The third area 16 consequently serves for secondary purification.

It has been found with experiments that the degree of pollution of the water, of the kind described at the beginning, introduced into the inventive apparatus or arrangement, can be greatly reduced. This of course increases quality protection and also the natural potential of the receiving waters.

The investment, maintenance and operational expenditures of the inventive apparatus are relatively small, its control can be automated in a simple manner, and its use does not require particular skills.

It is a further advantage of the inventive water purification process and apparatus that protection of natural lake banks is promoted since areas are made useful, such as swamps, reeds and the like, which ordinarily would not be taken into consideration for purposes of terrain regulation or reclamation.

It will be understood by those skilled in the art that departures from, additions to, modifications of, and other changes in the described process and apparatus (arrangement) can be made within the framework of the spirit and scope of the invention without departing from its essential novel and patentable features.

What we claim is:

1. Apparatus for purifying a flow of polluted water containing diffuse pollutants resulting from abalation prior to said flow reaching a living body of water, said apparatus comprising
    settling means for removing rubble drift from said flow;
    a first aquatic plant area adjacent a living body of water and having at least one natural and contiguous border therewith and directly communicating with said living body of water through said border, said first aquatic plant area having at least one distinct plant zone wherein aquatic plants biologically fix, immobilize or extract at least a part of the diffuse substances from the flow;
    means for guiding the flow from said settling means and along at least one flow path to said first aquatic plant area; and
    means in the path of said flow for increasing the surface area of the flowing polluted water in said first aquatic plant area so that substantially the entire width of the first aquatic plant area is covered by the flowing polluted water, said means in said flow path for increasing the surface area of the flowing water in said first aquatic plant area being a distribution channel disposed in the flow path and having an entry port intermediate the ends of the channel and through which the flow enters the channel, and having a plurality of exit ports through which the flow exits from the channel, and a deflecting element disposed in the entry port and at least partially across the flow path to substantially evenly distribute the flowing water to the exit ports.

2. Apparatus as claimed in claim 1 further including a second aquatic plant area having at least one distinct plant zone wherein aquatic plants biologically fix, immobolize or extract at least a part of the diffuse substances from the flow, said second aquatic plant area being disposed in said flow path so that the flow passes from said settling means to said second aquatic plant area then to said first aquatic plant area.

3. Apparatus as claimed in claim 2 further including a third aquatic plant area having at least one distinct plant zone wherein aquatic plants biologically fix immobilize or extract at least a part of the diffuse substances from the flow, said third aquatic plant area being disposed in said flow path in parallel with said second aquatic plant area so that the flow passes from said settling means to said third and said second aquatic plant areas then to said first aquatic plant area.

4. Apparatus as claimed in claim 1 further including means for regulating the rate of said flow.

5. Apparatus as claimed in claim 4 wherein said means for regulating comprises a water storage unit having an entry port and an exit port, the water storage unit being interposed in the path of said flow between the settling means and the first aquatic plant area, the entry port communicating with the settling means and the exit port communicating with the first aquatic plant area; and means for regulating the rate of flow from the exit port.

6. Process for purifying a flow of polluted water containing diffuse pollutants resulting from abalation prior to said flow reaching a living body of water, comprising the steps of:
    settling and removing rubble drift from said flow;
    then guiding the flow along at least one flow path to a first aquatic plant area;
    then contacting the flow in said first aquatic plant area with at least one distinct plant zone containing aquatic plants which biologically fix, immobilize or extract at least a part of the diffuse substances from the flow;
    increasing the surface area of the flowing polluted water in the first aquatic plant area so that substantially the entire width of the first aquatic plant area is covered by the following polluted water;
    then directly transmitting the flow from the first aquatic plant area to said living body of water through a natural border of said first aquatic plant area coextensive with and directly communicating with said living body of water, said step of increasing the surface area of the flowing polluted water in the first aquatic plant area being carried out by passing the flow into a distribution channel, deflecting the flow as it enters the channel, so that the flow is substantially evenly spread within the channel, then passing the substantially evenly spread flow out of the channel through a plurality of exit ports in a wall of the channel.

7. Process as claimed in claim 6 wherein after said settling and removing step and before said step of guiding the flow along at least one flow path to said first aquatic plant area the flow is guided along at least one flow path to a second aquatic plant area wherein the flow is contacted with at least one distinct plant zone containing aquatic plants which biologically fix, immobolize or extract at least a part of the diffuse substances from the flow.

8. Process as claimed in claim 6 wherein after said settling and removing step and prior to said step of guiding the flow along at least one flow path to the first aquatic plant area, the flow is guided along a first flow path to a second aquatic plant area wherein the flow is contacted with at least one distinct plant zone containing aquatic plants which biologically fix, immobolize or extract at least a part of the diffuse substances from the flow and along at least a second flow path to a third aquatic plant area in parallel with said second aquatic plant area and in which the flow is contacted with at least one distinct plant zone containing aquatic plants which biologically fix, immobolize, or extract at least part of the diffuse substances from the flow; then the flow is guided from the second aquatic plant area and from the third aquatic plant area to said first aquatic plant area.

9. Process as claimed in claim 6 further including the step of regulating the rate of said flow.

10. Process as claimed in claim 9 wherein said step of regulating the rate of said flow is carried out after said step of settling and removing and before the step of contacting the flow in said first aquatic plant area.

* * * * *